United States Patent [19]

Dietrich et al.

[11] Patent Number: 4,583,520
[45] Date of Patent: Apr. 22, 1986

[54] BALANCED SOLAR CONCENTRATOR SYSTEM

[75] Inventors: John J. Dietrich, Newport Beach; Donald A. Steinmeyer, Tustin; Dirck T. Hartmann, Huntington Beach, all of Calif.

[73] Assignee: McDonnell Douglas Corporation, Long Beach, Calif.

[21] Appl. No.: 636,749

[22] Filed: Aug. 1, 1984

[51] Int. Cl.[4] ............................................. F24J 3/02
[52] U.S. Cl. ........................... 126/424; 126/438; 126/451; 353/3; 350/636; 350/637
[58] Field of Search ............... 126/424, 425, 438, 451; 350/633, 634, 636, 637; 353/3; 60/641.8, 641.15

[56] References Cited

U.S. PATENT DOCUMENTS

| | | | |
|---|---|---|---|
| 3,643,648 | 2/1972 | Tarcici | 126/424 |
| 3,713,727 | 1/1973 | Markosian et al. | 350/636 X |
| 3,797,476 | 3/1974 | Tarcici | 126/424 |
| 3,998,206 | 12/1976 | Jahn | 60/641.15 X |
| 4,252,107 | 2/1981 | Horton | 126/438 |
| 4,295,462 | 10/1981 | Bunch | 126/424 |
| 4,347,834 | 9/1982 | York | 126/424 |
| 4,457,297 | 7/1984 | Sobczak et al. | 126/424 |
| 4,458,670 | 7/1984 | Lhenry | 126/424 |
| 4,463,749 | 8/1984 | Sobczak et al. | 126/451 |

FOREIGN PATENT DOCUMENTS

| | | | |
|---|---|---|---|
| 2440526 | 7/1980 | France | 126/425 |
| 2000319 | 1/1979 | United Kingdom | 126/425 |
| 2016675 | 9/1979 | United Kingdom | 126/424 |

OTHER PUBLICATIONS

"Parabolic Dish Concentrator Designs and Concepts", compiled by Brian Beveridge, Jet Propulsion Laboratory, Dec., 1980, pp. 23 and 27.

Primary Examiner—Margaret A. Focarino
Attorney, Agent, or Firm—Gregory A. Cone; George W. Finch; Donald L. Royer

[57] ABSTRACT

This solar concentrator system is configured such that the base pedestal attachment point is located on the beam connecting the curved solar reflector and the heat energy receiver power conversion unit, herein envisioned as a Stirling engine. This attachment point is located near the balance point CG (Center of Gravity) of the power conversion unit-supporting beam-curved reflector subsystem such that the loads on the base pedestal and the attached solar tracking drive systems are minimized.

8 Claims, 3 Drawing Figures

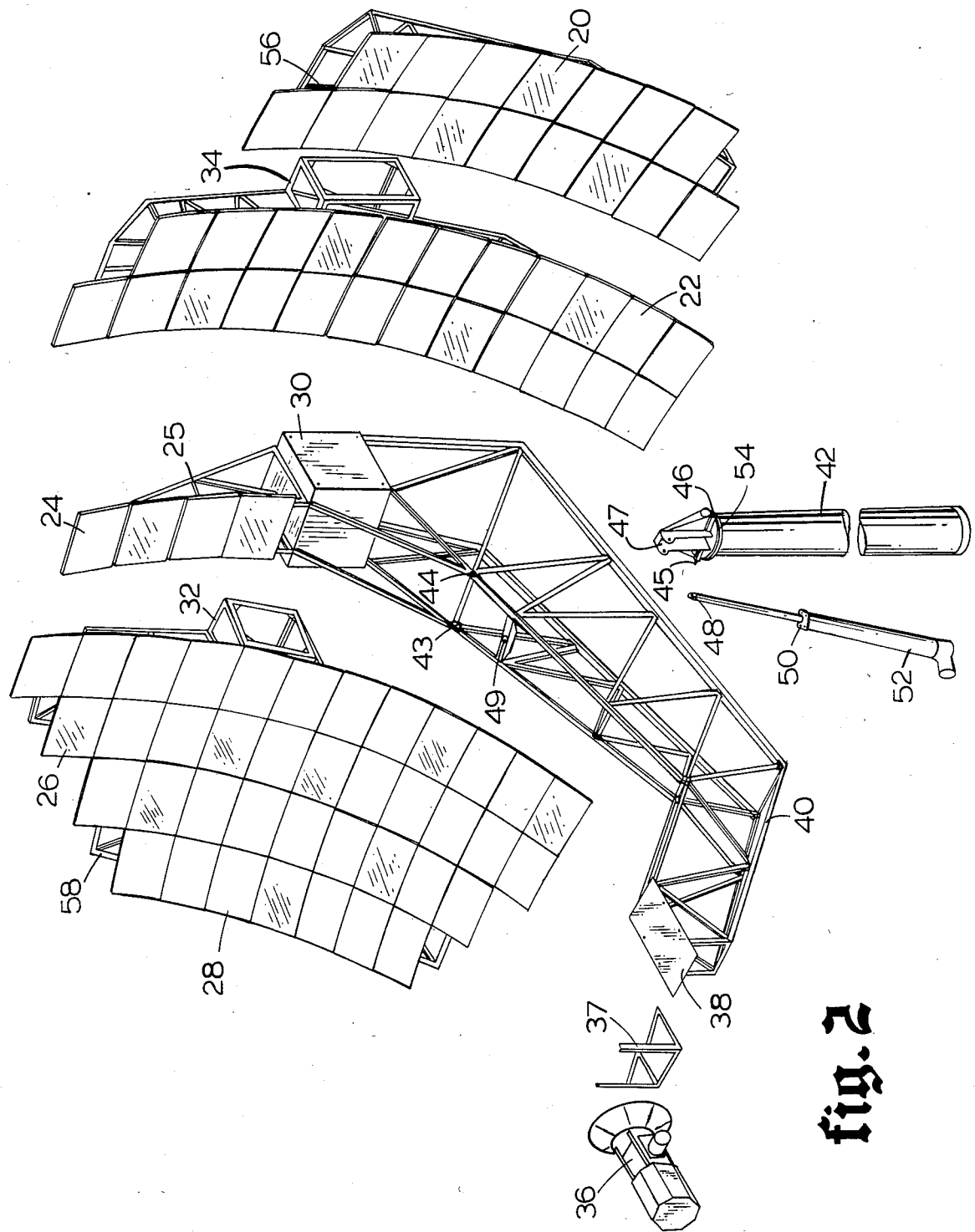

BALANCED SOLAR CONCENTRATOR SYSTEM

BACKGROUND OF THE INVENTION

This invention relates to solar energy power conversion systems. More particularly, this invention relates to reflective solar concentrator systems which support individual heat energy conversion units at their focal points. Still more particularly, this invention relates to improvements in the configuration of the supporting structure for such solar concentrator systems.

With the emphasis on alternative power sources to traditional fossil fuels, increasing attention has been paid in the last few years to solar power energy conversion systems. This invention is concerned generally with the conversion of solar heat energy into mechanical energy and then into electrical energy. One technique to this end has been to construct a large number of individual heliostats which reflect onto a central heat receiver through which commonly circulates some sort of liquid to which the heat energy reflected from the multiple heliostats is transferred at the centrally located heat collector point. This heated fluid is usually then conducted to some sort of turbine-electric power generator unit. An alternative strategy is to create a one-to-one correspondence between an individual heliostat and a heat energy converter. This is the basic thrust of the present invention. The standard configuration has been to locate a heat energy receiver/converter on a support structure which is attached to the periphery of the parabolic reflector such that the heat collector is located at the focus of the reflector. A base pedestal supports this heat collector/converter-support beam reflector subsystem. In prior art systems, the base pedestal has been located at the back side of the reflector. Other base support means have also been utilized besides a single pedestal; however, these other base supports have also been configured such that they are attached to the rear of the parabolic reflector. In any event, it is clear that the heat collector/converter-support beam reflector subsystem will act in almost all instances as a cantilevered load relative to the base support structure. As such, it places high loads upon the base support structure and the attached tracking drive motors necessary to accurately position the reflector subsystem relative to the changing position of the sun during the course of the day.

Apparently these prior art support configurations stem from the heritage of similar appearing radar dishes and the like. In such radar dishes, the power requirements of the tracking drive units are not a particularly significant criterion for the design of these radar dishes. However, in the design of a solar collector power energy conversion system, power efficiencies are critical to the economic success of the solar power conversion facility. Hence, these prior art designs for the solar concentrator systems have suffered from a relatively inefficient design which requires relatively high power tracking drive motors given the high loads that these designs place upon these motors.

SUMMARY OF THE INVENTION

This solar concentrator assembly comprises a curved reflector, heat energy receiver means which are located at the focus of the reflector, heat energy receiver support beam means attached to the reflector which hold the heat energy receiver means at the focus, and base support means attached to the receiver support beam means at a point between the reflector and the receiver such that the base support means include tracking drive means capable of accurately positioning the assembly relative to the path of the sun.

BRIEF DESCRIPTION OF THE DRAWINGS

FIG. 2 is a partially exploded isometric view of one embodiment of the solar concentrator system of the present invention.

DETAILED DESCRIPTION OF THE INVENTION

Figure 1:
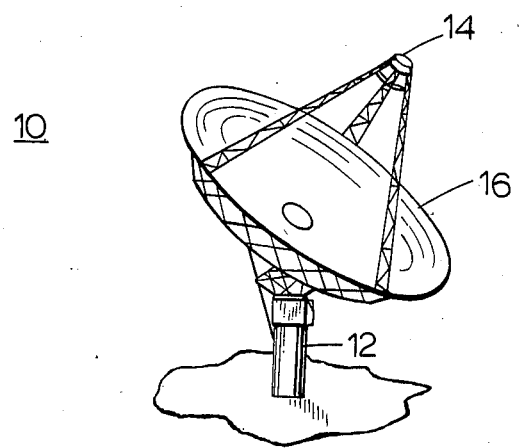
FIG. 1 is an isometric view of a prior art solar concentrator assembly.

As was mentioned above, one of the major problems with prior parabolic concentrators is that they require large tracking drive systems to overcome the overhung loads of the reflecting surfaces and the energy receiver at the concentrator focus. These concentrators require a two axis tracking capability to follow the sun, and large loads are applied to both axes. Counterweights may be used to reduce gravity loads in one axis by balancing the overhung loads. However, the counterweight requires increased bearing load capabilities to accommodate the additional weight. In addition, the counterweight is additional hardware with no other use. FIG. 1 shows a typical prior art solar concentrator without a counterweight. Notice the relatively massive size of the base pedestal support. The energy receiver 14 is supported at the focus of the reflector 16.

The balanced solar concentrator of the present invention provides a reflector geometry and total concentrator mass distribution in a manner which produces minimum drive loads and therefore significantly less costly drives. In addition, the smaller drive loads result in lower power consumption to operate the system, since much smaller drive motors may be utilized.

FIG. 2 shows a partially exploded isometric view of one embodiment of the present invention. In this particular embodiment, the reflective surface is initially fabricated as five separate elements. The center reflector assembly 24, here shown as the four individual panels fixed to the truss framework 25 which is attached to the center main beam 30 to the rear of the reflector panels, is flanked by the inner and outer reflector assemblies labelled 20 and 22 to the right and 26 and 28 to the left. These flanking assemblies have their own supporting structure to the rear of the reflective individual panels. The five subpanels are readily joined together in this embodiment by fastening together the center main beam element 30 with the left inner 32 and outer (not shown) main beam elements and the right inner and outer main beam elements 34 and 56. The corresponding reflective surfaces for these inner and outer elements are 28, 26, 22 and 20 respectively. The center reflective surface is marked 24. This modular construction technique allows for precision alignment of the individual modules at a factory whereby the critical alignments may be precisely controlled. In the field, relatively unskilled labor may be utilized to bolt the various subsections together to form an accurately aligned reflector. At the focus of the reflective surface is the heat collector/converter unit 36. In this particular embodiment the heat collector/converter is a Stirling engine. The Stirling engine 36 is mounted on a subframe 37 which is in turn attached to a platform 38 which forms a part of the power conversion unit (PCU) support beam 40 which is in turn attached to the framework which supports the reflective surface, specifically the central box section beam 30. This support beam 40 supports the Stirling engine 36 at the focus of the parabolic reflector. The entire assembly described to this point is supported upon a pedestal 42 containing the drive components. The main loads are received by pins 45 and 46 of the support pedestal 42 which are received in mounting holes 43 and 44 on the support beam 40 as shown. Additionally, the pedestal mounted drives have the capability to drive the reflector assembly in two axes. Elevating angular motion is achieved by a jackscrew drive 52. The upper portion of the jack screw drive 48 is attached to the pedestal at point 47. The lower portion of the jackscrew 50 is attached to the support beam 40 at point 49 as shown. Actuation of this jackscrew drive 52 will then cause the reflector to move in the plane defined by the pedestal 42 and the receiver (PCU) support beam 40. Azimuth angular motion about a vertical axis is provided for by a turntable type drive 54 contained within the upper portion of the pedestal 42. Such drives are well known elements of the prior art. What is significant is that the balance point of the system which includes the reflector with its supporting structure, the support beam 40, and the heat engine 36 is located between the reflective surface and the heat collector 36 and herein near the mounting points 45–46 on the pedestal and 43–44 on the support beam. In this particular embodiment, the structure has been designed such that the elevation drive element 52 will be in tension for all normal conditions. In this manner, the vertical drive element 52 may be much more accurately employed since it will not have to alternate between a tensional and a compressional operating condition with the attendant slack in the operating mechanisms in the system. Of course, the loading on the elevation drive could be designed to be exclusively compressional by appropriate repositioning of attachment points. Also, it is desirable to position the jackscrew drive such that it will be at minimum length and maximum mechanical advantage when the dish is pointed straight up in the high wind stow position.

Figure 3:
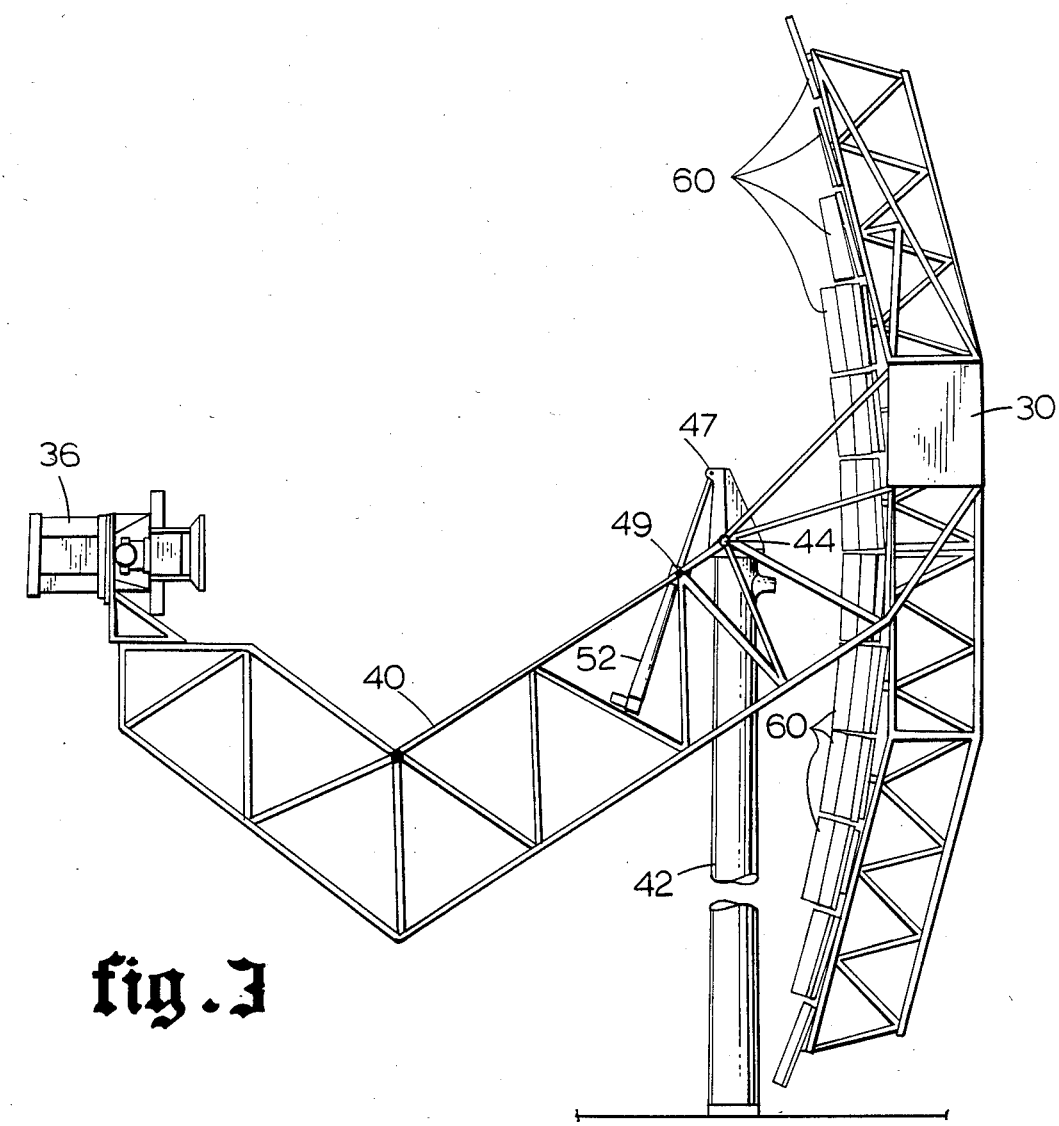
FIG. 3 is a cut-away side view of the solar concentrator shown in FIG. 2

FIG. 3 is a cutaway side view of the solar concentrator shown in FIG. 2. The cutting plane for this view is located just to the right of the central box beam 30 shown in FIG. 2. This view shows the system in its mounted condition with the reflector support beam 40-heat collector/converter 36 system being pivoted at point 44 on the beam 40 and supported by the pedestal 42. Also shown are the jackscrew elevation drive 52 attached between points 47 and 49 and a portion of the reflector surface here labelled as 60.

The elevation and azimuth drive means then act to accurately position the reflective concentrator surface to maximize the reflected solar energy which falls upon the collector of the heat collector/converter means 36. Normally this positioning of the concentrator reflector surface will be achieved by computer control which simultaneously controls the other of the plurality of individual collectors within the overall field. As can be seen, the unique mounting design utilized in this embodiment allows for the usage of downsized azimuth and elevation drive motors as well as supporting bearings in view of the greatly reduced loadings on these various elements as compared to the prior art structure shown in FIG. 1. Additionally, this construction allows for the structure to be moved in elevation to positions which were impossible in the prior art structures. Specifically, the heat collector/converter element 36 can be rotated down to ground level for easy servicing of this unit. Such a rotation is impossible with the prior art structures.

In an abstract geometric sense, the most optically efficient configuration for the shape of the concentrator surface will be that of a paraboloid. However, in reality, it turns out to be very difficult to test constructed devices for conformance with an optimized parabolic shape. Therefore, most concentrators tend to be spherical in configuration, since this shape is much easier to quality control. The reflective surface of the concentrator is shown in the figures here as being comprised of a plurality of individual curved reflective surfaces. Once again, it would probably be somewhat more efficient optically to utilize a single large reflective surface rather than the plurality of individual reflective elements; however, the economics of the fabrication of the reflective elements dictate that the smaller individual elements be utilized, since the cost of fabricating a single large large reflector is exorbitant. It should be noted that one further advantage to the single support beam which links the power conversion unit at the focus of the concentrator/reflector to the concentrator/reflector is that it minimizes the shadowing/blocking effects which might otherwise occur should the prior art support support structure illustrated in FIG. 1 be used.

Additionally, since the attachment point of the base pedestal support to the support beam is at or near the balance point for the power conversion unit-support beam-concentrator/reflector subsystem, the support beam structure may be minimized in that neither the power conversion unit nor the concentrator/reflector elements will represent an overhung load to any great extent relative to the attachment point. In other words, the PCU load is essentially decoupled from the reflector load with both loads having a direct path to the pivot at the attachment point. Also, the employment of the single receiver support beam as illustrated results in a situation wherein the normal gravity load deflections will be in the elevation plane only and therefore easily correctible by a slight re-aiming of the reflector. Another significant design criterion involves the wind loading on the concentrator/reflector dish. Wind loads on the dish will result in a center of pressure point located in space somewhere between the optical focus of the dish and the dish itself. Fortunately, this center of pressure point will usually fall somewhere reasonably close to the neutral balance point of the subsystem near or at which the power conversion unit-support beam-collector subsystem is attached to the pedestal support for the system of the present invention. The wind loading on the other hand only aggravates the problems of the prior art collector support systems as shown in FIG. 1. To the extent that expected wind loadings will significantly enter into the reasonably expected performance of the collector system, the dynamic loading of the collector system may require that the attachment point be shifted somewhat away from the neutral balance point along the support beam 40 to compensate for the location for the center of pressure caused by the wind loading and therefore reoptimize the structure of the system.

The particular heat collector/converter unit contemplated in this embodiment is a Stirling engine of the type manufactured by United Stirling AB, a subsidiary of the FFV Group, owned by the Swedish government. The particular engine utilized in this embodiment has been the 4-95 solar Stirling engine manufactured by United Stirling AB. Such engines are fairly well known in the art. In brief, a Stirling engine converts heat energy from any source to mechanical energy by means of the alternating compression and expansion of a confined gas. The working fluid (a small quantity of high pressure hydrogen or helium gas) is cooled during the compression stage and heated during the expansion stage. Residual heat energy is recycled through a packed-screen heat exchanger, called a regenerator, which acts as a heat sponge in the United Stirling engine. The regenerator stores a large portion of the heat of the working gas after expansion and returns the heat to that gas as the gas reverses direction. The pistons of the United Stirling engine have two functions: they move the gas back and forth between the hot and cold locations, and they transmit mechanical work to the drive shaft. Each piston operates simultaneously in two cycles: the hot upper surface of one piston is coordinated with the cold undersurface of the next piston, and so on. In this particular embodiment, the Stirling engine is connected to an electrical power generation means to convert the mechanical output from the Stirling engine into electrical output. The particular mechanical/electrical energy conversion means utilized in this embodiment is an alternator. Nevertheless, the system as described in the claims appended below is not necessarily limited to the employment of any particular heat collector/converter means such as the particular Stirling engine described above.

What is claimed is:

1. A curved reflector assembly comprising a curved reflector, heat energy receiver means located at the focus or the reflector, heat energy receiver support beam means attached to the reflector which hold the heat energy receiver at the focus, and base support means comprising a pedestal attached to the receiver support beams at a point between the reflector and the receiver such that the base support means include tracking drive means including elevation and azimuth drives capable of accurately positioning the assembly relative to the path of the sun wherein the elevation drive means are located between the pedestal and a point between the pedestal-receiver support beam means attachment point and the receiver.

2. The assembly of claim 1 wherein the position of the pedestal-receiver support beam means attachment point is located on the receiver support beam means such that the axial load on the elevation drive is normally always in tension.

3. The assembly of claim 1 wherein the position of the pedestal-receiver support beam means attachment point is located on the receiver support beam means such that the axial load on the elevation drive is normally always in compression.

4. A curved reflector assembly comprising a curved reflector, heat energy receiver means located at the focus of the reflector, heat energy receiver support beam means attached to the reflector which hold the heat energy receiver at the focus, and base support means comprising a pedestal attached to the receiver support beams at a point between the reflector and the receiver such that the base support means include tracking drive means including elevation and azimuth drives capable of accurately positioning the assembly relative to the path of the sun wherein the elevation drive means are located between the pedestal and a point between the pedestal-receiver support beam means attachment point and the reflector.

5. The assembly of claim 4 wherein the position of the pedestal-receiver support beam means attachment point is located on the receiver support beam means such that the axial load on the vertical drive is normally always in tension.

6. The assembly of claim 4 wherein the position of the pedestal-receiver support beam means attachment point is located on the receiver support beam means such that the axial load on the vertical drive is normally always in compression.

7. The assembly of claim 4 wherein the elevation drive is a jackscrew drive.

8. A curved reflector assembly comprising a curved reflector, heat energy receiver means located at the focus of the reflector, heat energy receiver support beam means attached to the reflector which hold the heat energy receiver at the focus, and base support means comprising a pedestal attached to the receiver support beams at a point between the reflector and the receiver such that the base support means include tracking drive means including elevation and azimuth drives capable of accurately positioning the assembly relative to the path of the sun wherein the receiver support beam means comprises a beam with one end supporting the heat energy receiver and the other end passing through a slot in the reflective surface of the reflector and attaching to the support structure thereof located behind the reflective surface of the reflector.

* * * * *